(12) United States Patent
Veer

(10) Patent No.: US 9,404,250 B2
(45) Date of Patent: Aug. 2, 2016

(54) COMBINATION OF A CONNECTOR FOR GLASS ELEMENTS AND SUCH GLASS ELEMENTS

(71) Applicant: Technische Universiteit Delft, Delft (NL)

(72) Inventor: Fredericus Albertus Veer, Delft (NL)

(73) Assignee: Technische Universiteit Delft, Delft (NL)

( * ) Notice: Subject to any disclaimer, the term of this patent is extended or adjusted under 35 U.S.C. 154(b) by 72 days.

(21) Appl. No.: 14/593,727

(22) Filed: Jan. 9, 2015

(65) Prior Publication Data

US 2015/0121802 A1 May 7, 2015

Related U.S. Application Data

(63) Continuation of application No. PCT/NL2013/050436, filed on Jun. 20, 2013.

(51) Int. Cl.
| | |
|---|---|
| *E04B 1/38* | (2006.01) |
| *E04B 1/48* | (2006.01) |
| *B32B 17/10* | (2006.01) |
| *E04C 3/28* | (2006.01) |
| *E04C 3/36* | (2006.01) |
| *E04C 3/46* | (2006.01) |
| *E04B 1/28* | (2006.01) |

(52) U.S. Cl.
CPC ............. *E04B 1/48* (2013.01); *B32B 17/10045* (2013.01); *B32B 17/10366* (2013.01); *E04B 1/28* (2013.01); *E04C 3/285* (2013.01); *E04C 3/36* (2013.01); *E04C 3/46* (2013.01)

(58) Field of Classification Search
CPC ............. E04C 2/54; E04C 3/285; E04C 3/46; E04B 1/28; E04B 2/90; F16B 5/0004; F16B 5/0024; F16B 5/0614; E06B 3/5436; E06B 3/02; B32B 17/10239; E04F 11/1853
USPC .......................................................... 52/702
See application file for complete search history.

(56) References Cited

U.S. PATENT DOCUMENTS

| | | | |
|---|---|---|---|
| 4,406,105 A * | 9/1983 | Colvin ........................ | 52/204.58 |
| 5,104,252 A | 4/1992 | Colonias et al. | |

(Continued)

FOREIGN PATENT DOCUMENTS

| | | |
|---|---|---|
| DE | 29807619 | 8/1998 |
| DE | 202006017856 | 2/2007 |

(Continued)

OTHER PUBLICATIONS

Schetter, "Design and Evaluation of a Large Span Glass Beam with Safe Failure Behaviour", http://alexandria.tue.nl/extra2/afstversl/bwk/629575.pdf, Apr. 1, 2007, 33-37.

*Primary Examiner* — Brian Glessner
*Assistant Examiner* — Gisele Ford
(74) *Attorney, Agent, or Firm* — Peacock Myers, P.C.; Jeffrey D. Myers

(57) ABSTRACT

A combination of a connector for glass elements and such glass elements to provide a loadbearing glass construction that comprises at least one glass post and at least one glass beam that are arranged adjacent to each other, wherein the connector is arranged to provide a rotationally fixed connection between the post and the beam.

6 Claims, 2 Drawing Sheets

(56) References Cited

U.S. PATENT DOCUMENTS

| | | | |
|---|---|---|---|
| 5,577,856 A * | 11/1996 | Tezuka | 403/294 |
| 5,896,721 A * | 4/1999 | Sugiyama | 52/712 |
| 6,546,690 B1 * | 4/2003 | Lamberts | 52/847 |
| 2004/0006939 A1 * | 1/2004 | Jobs et al. | 52/235 |
| 2005/0055941 A1 * | 3/2005 | Vogler | 52/578 |
| 2007/0051452 A1 * | 3/2007 | Ward et al. | 156/101 |
| 2009/0110866 A1 * | 4/2009 | Ainz et al. | 428/53 |
| 2012/0031022 A1 * | 2/2012 | Morgan et al. | 52/204.62 |
| 2012/0090251 A1 * | 4/2012 | Andreini et al. | 52/81.6 |
| 2013/0308999 A1 * | 11/2013 | Black | 403/205 |
| 2013/0315652 A1 * | 11/2013 | Eding | 403/20 |
| 2014/0079474 A1 * | 3/2014 | Andreini et al. | 403/292 |

FOREIGN PATENT DOCUMENTS

| | | |
|---|---|---|
| DE | 202010015999 | 2/2011 |
| WO | 2014/011032 | 1/2014 |

* cited by examiner

COMBINATION OF A CONNECTOR FOR GLASS ELEMENTS AND SUCH GLASS ELEMENTS

CROSS-REFERENCE TO RELATED APPLICATIONS

This application is a continuation application of Patent Cooperation Treaty Application No. PCT/NL2013/050436, filed on Jul. 9, 2103, which claimed priority to Netherlands Patent Application No. 2009159, filed on Jul. 9, 2012, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to a combination of a connector for glass elements and such glass elements to provide a loadbearing glass construction that comprises at least one glass post and at least one glass beam that are arranged adjacent to each other.

2. Description of Related Art

Such a combination is known from US2005/0055941. In this known combination the connector comprises a first fitting which is fitted to a first loadbearing glass component, a second fitting fitted to a second loadbearing glass component, and a glass load transmitting element located between the first fitting and the second fitting.

The known combination of connector and glass elements is used in order to benefit from the aesthetic qualities of glass as a constructional material. Obviously glass is transparent and when properly applied it allows for attractive designs in buildings. There are however important disadvantages that prevent widespread use of glass as a constructional material. As acknowledged in the prior art glass is a brittle material, which will fracture without any deformation at all. Glass does therefore not allow the use of common constructional measures that are possible with other constructional materials. The effort is therefore on the engineer to make use of glass in a manner that allows for the construction of a main loadbearing structure that basically consists of glass.

DE-U-298 07 619; DE-U-20 2010 015999; and the master's thesis of L. P. T. Schetters "Design and evaluation of a large span glass beam with safe failure behaviour", URL: http://alexandria.tue.nl/extra2/afstversl/bwk/629575.pdf; 1 Apr. 2007, pages 33-37, XP 55057918 each separately disclose a combination of a connector for glass elements and such glass elements to provide a loadbearing glass construction that comprises at least one glass post and at least one glass beam that are arranged adjacent to each other, and wherein the connector is arranged to provide a rotationally fixed connection between the post and the beam. DE-U-20 2010 015999 further discloses that at least along a part of their edges the glass elements comprise reinforcement elements and that the connector is connected to said reinforcement elements.

BRIEF SUMMARY OF THE INVENTION

To obviate the problems with glass as a constructional material and to make effective use of glass as part of a main loadbearing structure, the invention aims at such a combination of a connector, a glass post and a glass beam, having the features of one or more of the appended claims.

In addition to the feature that the connector is connected to both the post and the beam—wherein the beam may also be curved—and is arranged to provide a rotationally fixed connection between the post and the beam which provides constructional rigidity and loadbearing capacity of the construction, and further in addition to the feature that at least along a part of their edges the glass elements comprise reinforcement elements wherein the connector is connected to said reinforcement elements, the construction of the invention has the feature that the connector and the reinforcement elements are embodied with cooperating protrusions and receptacles. This avoids the use of providing for a connection between the post- and beam by chemical means (for instance by gluing) in the factory, and makes possible that the construction can be completed on-site. This is cost-efficient in comparison with the prior art necessity to prepare all constructional material at the factory. Making use of the mentioned reinforcement elements and connector embodied with cooperating protrusions and receptacles alleviates also the burden of solving the problem how to reliably connect the connector with the glass post and the glass beam without damaging them.

It is preferable that the connector is arranged to match the contour of the edges of the post and beam at least near to and/or where the post- and beam are adjacent to each other.

Preferably further the glass elements are laminated glass sheets wherein the reinforcement elements are provided next, meaning directly or indirectly neighboring, to the edge of a central glass sheet which is embedded between further glass sheets of the laminated glass sheets such that the outer edge surface of the reinforcement elements is flush with the outer edge surfaces of the neighboring glass sheets. In this way a very close fitting connection can be made between the connector, the glass post and the glass beam.

The invention is also embodied in the construction of a glass post with a glass beam combined with a connector for such glass elements, wherein the connector is arranged to provide a rotationally fixed connection between the post and the beam and the connector comprises a shoulder element which is provided with two legs placed on opposite sides of the glass post, which legs are connected with a bridge portion resting on said glass post, and wherein each of the two legs has a U-shaped portion for support of the glass beam.

The structural rigidity and moment bearing capacity of the combination benefits when the connector comprises a first connector element at the outer corner of the post- and beam and a second connector element at the inner corner of the post- and beam, wherein the first connector element and the second connector element are connected to each other.

Preferably the first connector element and the second connector element are connected to each other by the shoulder element. In this way the shoulder element not only helps during the making of the construction, but it also has the function of improving the construction as such.

The invention will hereinafter be further elucidated with reference to the drawings of a non-limiting typical example of a combination of a connector, glass post and glass beam in accordance with the invention.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 2:
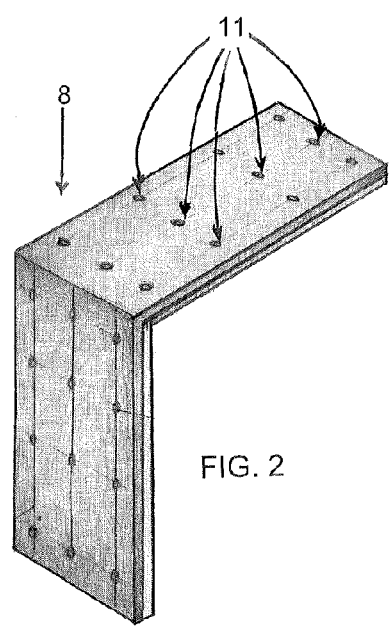
FIG. 2 shows a single connector element for an outer corner formed by a post- and beam.
Figure 1:
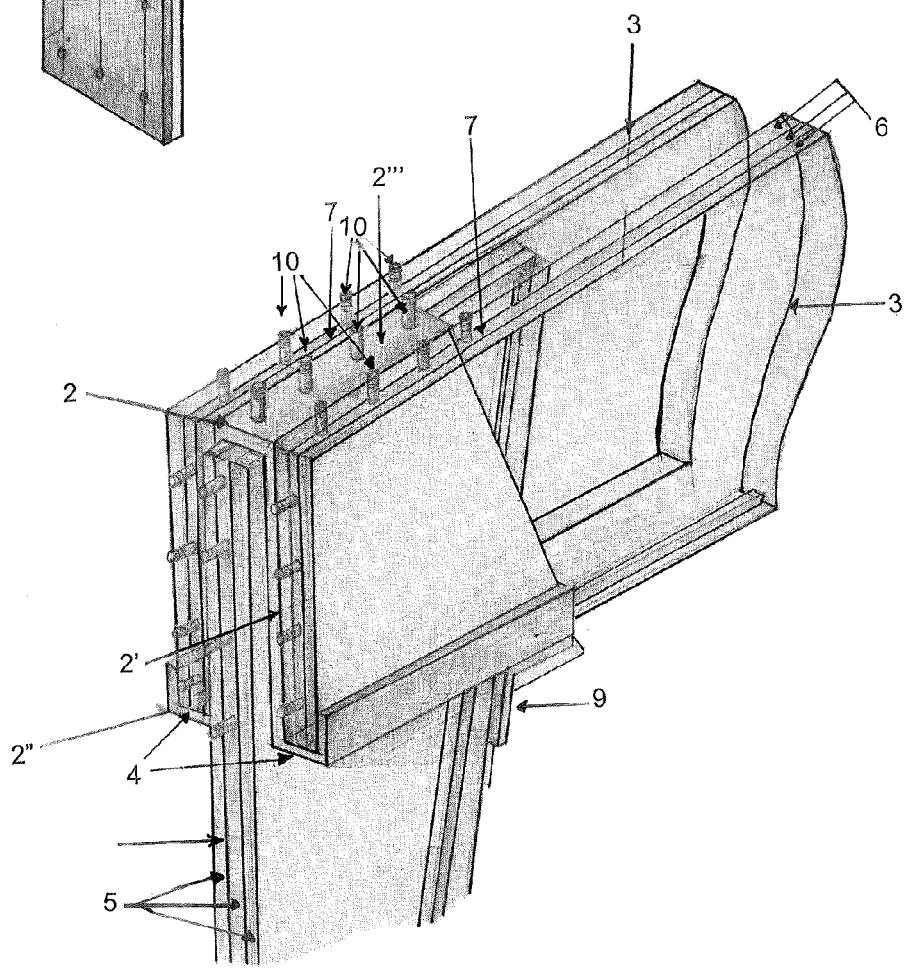
FIG. 1 shows a top part of a glass post, which supports a shoulder that forms part of a connector, wherein the shoulder supports two glass beams.

In order to provide a clear view at the features of the construction according to the invention, FIG. 1 and FIG. 2 show separate elements of the construction that have to be assembled for completing the construction.

In FIG. 1 a glass post 1 is shown that supports a shoulder 2. Although this shoulder 2 is not essential for the construction of the invention, it is helpful and assists in completing the construction of the said glass post 1 with one or more glass beams 3. The shoulder 2 is provided with two legs 2', 2" placed on opposite sides of the glass post 1, and said legs 2', 2" are connected with a bridge portion 2''' resting on said glass post 1. To assist the construction of the glass post 1 with the glass beams 3, each of the two legs 2', 2" has a U-shaped portion 4, each U-shaped portion 4 supporting a glass beam 3.

Figure 3:
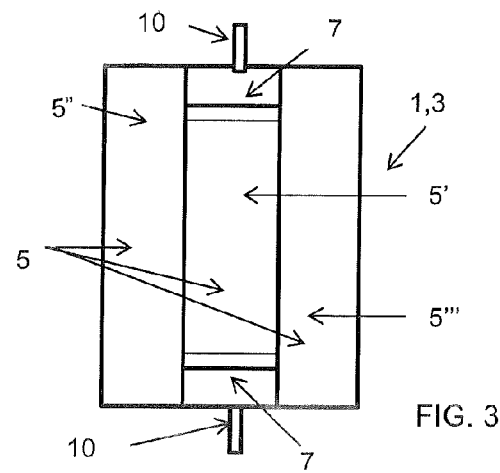
FIG. 3 shows a cross-section of a glass element.

As is further shown in FIG. 1 with reference to the glass elements 5, 6 of the glass post 1 and the glass beam 3 and the cross-section of the glass element 5 shown in FIG. 3, these elements are laminated glass sheets. FIG. 3 shows this clearly in cross-section for glass element 5. With reference further to FIG. 3 it is shown that the laminated glass elements have reinforcement elements 7 that are provided immediately next to the edge of a central glass sheet 5' which is embedded between further glass sheets 5", 5''' of the laminated glass element 5 such that the outer edge surface of the reinforcement elements 7 is flush with the outer edge surfaces of the neighboring glass sheets 5", 5'''. There may also be some room or another element between the central glass sheet 5' and the reinforcement elements 7. The function of these reinforcement elements 7 will become apparent hereinafter.

Figure 4:
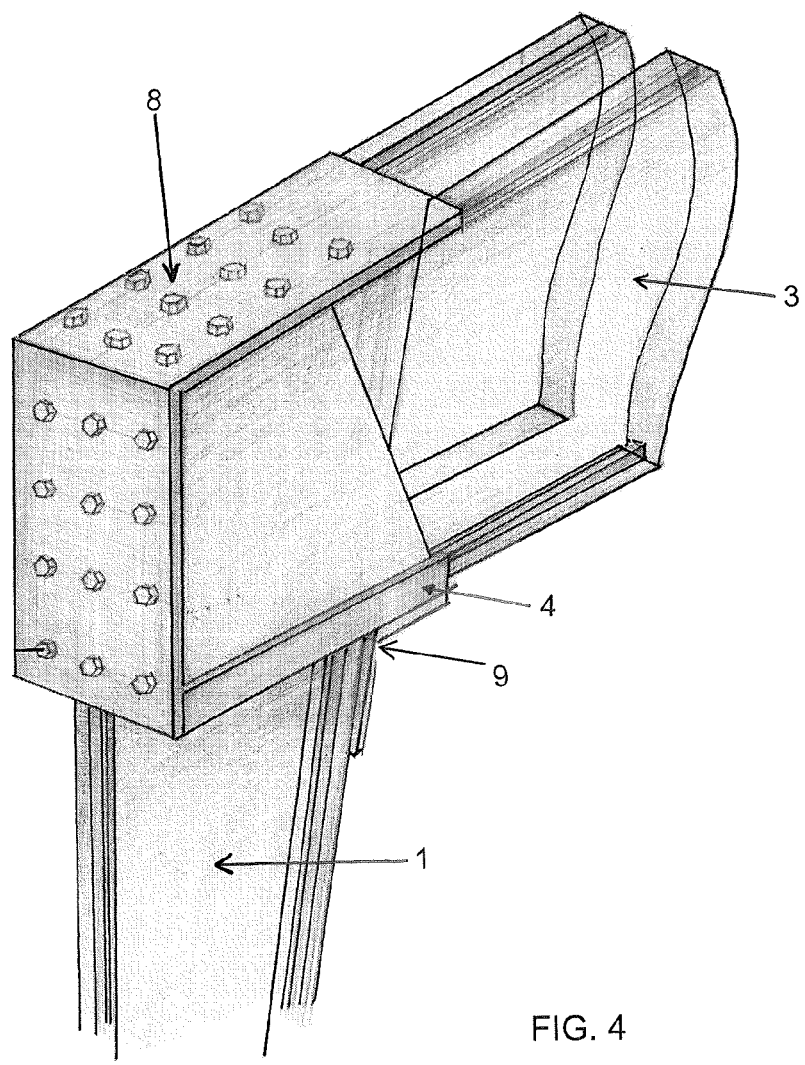
FIG. 4 shows the combination of the post, beam and connector of the invention in mounted condition.

In accordance with the invention a connector, an outer corner part 8 of which is shown in FIG. 2, is connected to the glass post 1 and the glass beam(s) 3 (which are shown in FIG. 1) to provide constructional rigidity and loadbearing capacity to this mounted combination. When for instance the corner part 8 of FIG. 2 is mounted to the outer corner of the glass post 1 and the glass beams 3 shown in FIG. 1, this provides a rotationally fixed connection between the post 1 and the beams 3. For this purpose it is desirable that the connector, including the outer corner part 8 is connected to both the post 1 and the beams 3. This is depicted in FIG. 4 showing the mounted condition of the combination of post 1, beam 3 and connector. FIGS. 1 and 4 show that there is also an inner corner part 9 which is connected in like manner to the glass post 1 and glass beams 3. Preferably the outer corner part 8 and the inner corner part 9 are also connected to each other. When as shown in FIG. 1 a shoulder 2 is used for support of the beams 3 during the forming of the construction, this shoulder 2 may provide the connection between the outer corner part 8 and the inner corner part 9 after mounting of the beams 3 to the glass post 1, and thus may form part of the connector. If the nonessential shoulder 2 is absent, a separate connecting element may be applied for this purpose.

It is preferred that the connector 2, 8, 9 is arranged to match the contour of the edges of the post 1 and beam(s) 3 at least near to and/or at the location where the post 1 and beam(s) 3 are adjacent to each other.

As mentioned already above, at least along a part of their edges the glass elements 5, 6 of the glass post 1 and the glass beams 3 comprise reinforcement elements 7, and the connector, particularly the outer corner part 8 and the inner corner part 9 of the connector, are connected to said reinforcement elements 7. Preferably for this purpose the connector 8, 9 and the reinforcement elements 7 are embodied with cooperating protrusions 10 and receptacles 11. The protrusions 9 may be formed on the reinforcing elements 7, and the receptacles 11 for the protrusions 10 may be formed in the shoulder 2 if such a shoulder is present. The receptacles 11 for the protrusions are anyway provided in the inner corner part 9 and the outer corner part 8 of the connector. Although not shown in the figures it may of course also be arranged vice versa such that all receptacles are provided in the reinforcement elements 7, and the protrusions are provided in the connector parts. Preferably however the protrusions 10 are provided on the reinforcing elements 7 and extend through the receptacles 11 to enable making a bolt-nut connection with the parts of the protrusions 10 extending through the receptacles 11.

It is explicitly remarked that the above discussion with reference to the figures of the drawing only serves to elucidate the claims and remove any possibly existing ambiguity in the claims. The protective scope that merits the invention is only determined by the claims, and the claims are not limited by the shown embodiment.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A combination of a connector for glass elements and said glass elements to provide a loadbearing glass construction that comprises at least one glass post and at least one glass beam adjacent to each other, wherein the connector provides a rotationally fixed connection between the post and the beam, and wherein at least along a part of their edges the glass elements comprise reinforcement elements and the connector is connected to said reinforcement elements, wherein the connector and the reinforcement elements have cooperating protrusions and receptacles, wherein the connector comprises a first connector element at an outer corner of the post and beam and a second connector element at an inner corner of the post and beam, and wherein the first connector element and the second connector element are connected to each other.

2. The combination according to claim 1, wherein the connector is connected to both the post and the beam.

3. The combination according to claim 1, wherein the connector is arranged to match the contour of the edges of the post and beam proximate the location where the post and beam are adjacent to each other.

4. The combination according to claim 1, wherein the glass elements are laminated glass sheets wherein the reinforcement elements are provided directly or indirectly neighboring to the edge of a central glass sheet which is embedded between further glass sheets of the laminated glass sheets such that the outer edge surface of the reinforcement elements is flush with the outer edge surfaces of neighboring glass sheets.

5. The combination according to claim 1, wherein the connector comprises a shoulder element which is provided with two legs placed on opposite sides of a glass post, which legs are connected with a bridge portion resting on said glass post, and wherein each of the two legs has a U-shaped portion for support of a glass beam.

6. The combination according to claim 1, wherein the first connector element and the second connector element are connected to each other by the shoulder element.

\* \* \* \* \*